3,223,728
PROCESS FOR THE PREPARATION OF
POLYCHLOROBENZOIC ACIDS
Eugene P. Di Bella, Rochelle Park, N.J., assignor, by mesne assignments, to Tenneco Chemicals, Inc., a corporation of Delaware
No Drawing. Filed Dec. 31, 1962, Ser. No. 248,193
8 Claims. (Cl. 260—515)

This application is a continuation-in-part of my copending application, Serial No. 748,115, filed July 14, 1958, now abandoned.

The present invention relates to the production of polychlorobenzoic acids having a chlorine atom in each of the two positions ortho to the carboxyl group. While the present invention is primarily concerned with production of 2,3,6-trichlorobenzoic acid and to mixtures of trichlorobenzoic acids containing substantial amounts of the 2,3,6-isomer, it also is concerned with production of other polychlorobenzoic acids having chlorine in the 2 and 6 positions on the ring.

2,3,6-trichlorobenzoic acid and mixtures of trichlorobenzoic acids containing substantial amounts of the 2,3,6-isomer are widely used as herbicides. They have been found to be of special value in the elimination of dicotyledoneous weeds from fields of such monocotyledonous crops as corn and sugarcane. They are also useful as total herbicides which can prevent all plant growth along railroad rights-of-way, in parking areas, and in similar areas.

Several methods have been described in the literature for the preparation of 2,3,6-trichlorobenzoic acid, but none of these results in high yields of products containing substantial amounts of the desired isomer. Methods involving oxidation of the methyl group of trichlorotoluene utilizing a wide variety of oxidizing agents generally give low yields of 2,3,6-trichlorobenzoic acid, probably because of steric hindrance effects resulting from the spatial arrangement of the chlorine atoms. It is known that a polychlorotoluene, for example, 2,4,5-trichlorotoluene, not having a chlorine atom in each position adjacent to the side chain can be converted to the corresponding polychlorobenzoic acid by side chain chlorinating the polychlorotoluene to form polychlorobenzotrichloride and then hydrolyzing this trichloride to the corresponding polychlorobenzoic acid. This reaction is illustrated by the following equations for 2,4,5-trichlorotoluene as the starting material:

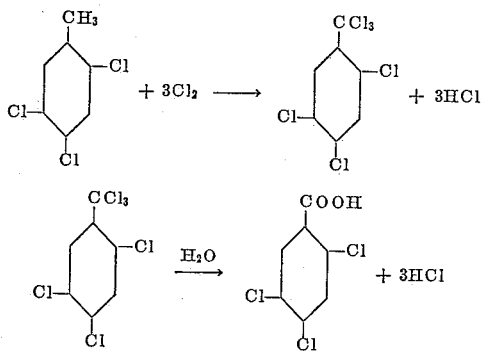

Routes such as the foregoing employing exhaustive side-chain chlorination are subject to the undesirable competing reaction of side-chain chlorinolysis when applied, for example, to 2,3,6-trichlorotoluene or to a mixture of trichlorotoluenes containing the 2,3,6-isomer and for this reason yield products containing relatively small amounts of the 2,3,6-isomer. In side-chain chlorinolysis, the side chain is replaced wth a chlorine atom.

In accordance with the present invention 2,3,6-trichlorobenzoic acid and mixtures of this isomer with other isomers of trichlorobenzoic acid can be prepared in high yields from the corresponding trichlorotoluenes by first side-chain chlorinating the trichlorotoluenes to form an intermediate product and then hydrolyzing and oxidizing this intermediate product to trichlorobenzoic acids by heating it with chlorine in the presence of water and an inorganic acid. Use of this procedure results in yields as high as 99% of trichlorobenzoic acid containing up to approximately 75% of the 2,3,6-isomer.

In addition to its use in the preparation of 2,3,6-trichlorobenzoic acid from 2,3,6-trichlorotoluene, this procedure can be used to convert to the corresponding chlorobenzoic acids other polychlorotoluenes having chlorine atoms in at least the two ring positions adjacent to the methyl group. For example, 2,6-dichlorotoluene, 2,4,6-trichlorotoluene, 2,3,5,6-tetrachlorotoluene, and 2,3,4,5,6-pentachlorotoluene, or mixtures of polychlorotoluenes containing one or more of these hindered isomers can be efficiently converted to the corresponding polychlorobenzoic acids by this procedure. Similarly, mixtures of polychlorobenzoic acids having chlorine in at least the two ring positions adjacent to the carboxyl group can be prepared by this procedure.

The course of the reaction for converting polychlorotoluene having chlorine atoms in at least the 2 and 6 positions to the corresponding polychlorobenzoic acids may be represented as follows, it being noted that the amount of HCl produced during the last or oxidation step has not been indicated:

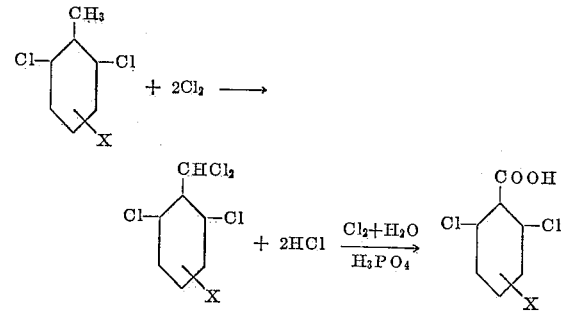

wherein X represents 0, 1, 2, or 3 chlorine atoms. Any polychlorotoluenes having chlorine atoms in other than the 2 and 6 positions are converted to the corresponding polychlorobenzoic acids, probably through the polychlorobenzotrichloride.

The excellent yields of trichlorobenzoic acid of high 2,3,6-isomer content are surprising inasmuch as it is known that side-chain chlorination of a mixture of isomers of polychlorotoluenes beyond the benzalbenzotrichloride stage ordinarily results in chlorinolysis, that is, splitting off of the dichlorinated side-chain from the aromatic nucleus of the 2,3,6-isomer. It has been found, however, that when the chlorination is carried beyond this stage in the presence of water and an inorganic acid, such as phosphoric acid, the oxidation-hydrolysis step apparently predominates, and little or no chlorinolysis of the 2,3,6-isomer takes place.

The starting material in this process is generally a mixture of trichlorotuluenes containing a substantial amount of the 2,3,6-isomer. This material can be prepared, for example, by chlorinating toluene o-chlorotoluene, or dichlorotoluene in the presence of a nuclear chlorinating catalyst, such as aluminum chloride or iron filings. If desired, substantially pure 2,3,6-trichlorotoluene may be used.

Alternatively, trichlorobenzalchloride or a mixture of trichlorobenzalchlorides and trichlorobenotrichlorides containing a substantial abount of 2,3,6-trichlorobenzalchloride can be used as the starting material of the present invention. These compounds are conveniently obtained by the side-chain chlorination of trichlorotoluene according to a process hereinafter described. They can be used as obtained from the chlorination, or they can be separated or purified by known procedures. The composition of the mixture of products resulting from the side-chain chlorination of trichlorotoluene is largely dependent upon the isomer distribution of the starting material since those trichlorotoluene isomers having chlorine atoms in the 2 and 6 positions, that is, the 2,3,6- and 2,4,6-isomers, are converted to trichlorobenzal chlorides, whereas the other isomers are converted to trichlorobenzotrichlorides.

Several different reaction procedures can be employed in carrying out my invention. In a preferred embodiment of the invention trichlorotoluene is side-chain chlorinated in the presence of an inorganic acid, such as concentrated phosphoric acid, until approximately 2 gram atoms of chlorine has been added for each gram molecule of trichlorotoluene, and then without isolation of the intermediate product or removal of the inorganic acid the chlorination is continued while sufficient water is added to the reaction mixture to effect its conversion to trichlorobenzoic acids. Alternatively, the process can be carried out in two steps. In the first step trichlorotoluene is side-chain chlorinated to form a mixture containing largely trichlorobenzal chloride and trichlorobenzotrichloride; in the second step this mixture is chlorinated in the presence of water and an inorganic acid, such as concentrated phosphoric acid, to convert it to trichlorobenzoic acid.

As has been indicated, the side-chain chlorination of trichlorotoluene is accomplished by means of known procedures and can be carried out in the presence or in the absence of the inorganic acid that is required in the subsequent oxidation-hydrolysis step. The side-chain chlorination is generally carried out by heating trichlorotoluene with gaseous chlorine until analysis or determination of weight increase indicates that between approximately 2.0 and 2.5 gram atoms of chlorine has reacted with (added to) each gram molecule of trichlorotoluene. The amount of chlorine used is dependent upon the isomer contents of the trichlorotoluene, since the isomers containing chlorine atoms in the 2 and 6 positions require 2 gram atoms of chlorine to convert each gram molecule of the trichlorotoluene to a trichlorobenzal chloride, while the other isomers are converted to trichlorobenzotrichlorides and/or trichlorobenzal chlorides by the addition of 3 gram atoms of chlorine to the side chain per gram molecule of trichlorotoluene. For a mixture of trichlorotoluene isomers the minimum amount of weight increase as a result of chlorine addition to or reaction with the side chain is 2 gram atoms of chlorine per gram molecule of trichlorotoluene so that all of the trichlorotoluene is converted to trichlorobenzal chloride. The maximum amount of chlorination is 2 gram atoms of chlorine per gram molecule of trichlorotoluene having chlorine in both the 2 and 6 positions and 3 gram atoms of chlorine per gram molecule of trichlorotoluene not having chlorine in both the 2 and 6 positions. Thus, for a gram molecule of trichlorotoluene containing 50% of the 2,3,6-isomer and 50% of the 2,4,5-isomer, the minimum side-chain chlorination would be 2 gram atoms of chlorine and the maximum weight increase as a result of chlorination of the side chain would be 2.5 gram atoms per mole of trichlorotoluene. If the trichlorotoluene contained 10% of 2,3,6-isomer and 90% of 2,4,5-isomer, then the minimum and maximum amounts of side-chain chlorination would be 2 gram atoms of chlorine and 2.9 gram atoms, respectively. For pure 2,3,6-trichlorotoluene the amount of side chain chlorination would be 2 gram atoms. Exhaustive side-chain chlorination is avoided at this stage since it leads to chlorinolysis and a resulting decrease in the yield of the 2,3,6-isomer. Accordingly, side-chain chlorination at this stage preferably is interrupted before all of the trichlorotoluene not substituted in the 2 and 6 positions is converted to trichlorobenzotrichloride to prevent chlorinolysis of the trichlorotoluene substituted in the 2 and 6 positions. When polychlorotoluene is side-chain chlorinated, one mole of chlorine is required for each atom of chlorine added to the side chain as one mole of HCl is formed which is removed as a gas $(-CH_3 + Cl_2 \rightarrow -CH_2Cl + HCl)$.

The preferred temperature at which this step is conducted is approximately 180° to 230° C. At temperatures below 150° C., the reaction takes place too slowly to be of commercial importance. The practical upper limit of the temperature range is the reflux temperature of the reaction mixture. Higher temperatures can be used, however, if the chlorination is carried out under super-atmospheric pressure. This chlorination step can be carried out in the presence of a chlorination catalyst if desired, but the use of such a catalyst is usually not required. Any of the known side-chain chlorination catalysts can be employed. When the side-chain chlorination is carried out in the presence of 85–100% phosphoric acid, however, the catalyst chosen must be one that is stable in the presence of water. Strong visible light is a preferred catalyst. In general it has been found that when the reaction is carried out at a temperature in the lower portion of the specified range, a catalyst can be used to advantage to accelerate the reaction rate. In the preferred temperature range, however, the reaction rate is sufficiently rapid that a chlorination catalyst is not needed.

The chlorination is carried out by flowing gaseous chlorine under or over the surface of the well-agitated mixture. The rate at which chlorine is introduced is not critical. At relatively high rates of flow only a small portion of the chlorine added takes part in the reaction; at low rates of flow the time required for completion of the reaction is increased.

The time required for the side-chain chlorination is dependent to a large extent upon the reaction temperature and upon the rate at which chlorine is introduced into the reaction vessel. At temperatures in the lower portion of the specified range, the time required for the addition of the desired amount of chlorine is lengthy, whereas relatively little time is required at higher temperatures. Similarly a longer reaction time is generally required with a slow chlorine flow rate than with a faster rate.

The oxidation-hydrolysis step is ordinarily conducted by passing gaseous chlorine through a mixture containing the products of the side-chain chlorination of trichlorotoluene, water, and an inorganic acid, such as phosphoric acid, until substantially all of the organic material has been converted to trichlorobenzoic acid.

This reaction takes place at temperatures between approximately 150° and 230° C., with the preferred range approximately 190° and 220° C. While some oxidation and hydrolysis may take place below 150° C., the reaction rate at such low temperatures is far too slow to be of commercial importance. The practical upper limit of the temperature range is the reflux temperature of the reaction mixture. Temperatures above 230° C. can be used if the reaction is carried out under super-atmospheric pressure. Between 220° and 230° C. nuclear-chlorinated by-products of the chlorinated trichlorotoluenes are formed in appreciable amounts and there is a tendency for the reactants to sublime from the reaction vessel. For convenience in operation, this step is generally conducted at the reflux temperature of the reaction mixture; it can, however, be conducted at temperatures below the reflux temperature provided that the temperature chosen falls within the range specified. The reflux temperature is determined by the rate at which water is added to the reaction mixture, since it is dependent upon the amount of water present. When relatively large amounts of water are present, reflux temperatures are low. In the absence of water, the reflux temperature rises to the boiling point of the chlorinated trichlorotoluene mixture. When the reaction mixture has a reflux temperature in the range of 150°–170° C., the oxidation-hydrolysis takes place slowly until sufficient water has been consumed to cause the reflux temperature to rise to the preferred range. The required amount of water is added at such a rate as to maintain the reaction temperature in the desired range.

Phosphoric acid is the inorganic acid I prefer to use in this reaction. Mixtures of sulfuric acid and boric acid also may be used. As used herein, the term "phosphoric acid" includes all forms of this acid, for example, ortho-phosphoric acid, pyrophosphoric acid, metaphosphoric acid, hypophosphoric acid, and mixtures thereof. Acid of at least 85% concentration is preferred since the use of less concentrated acid introduces sufficient water to bring about a low initial reaction (reflux) temperature and a correspondingly slow reaction rate. When less concentrated acid is used, the preferred reaction temperature can be attained only after consumption of or removal of sufficient water to bring the acid concentration to the desired range.

The amount of phosphoric acid required to give satisfactory results in this process lies between approximately 0.2 and 3.0 gram molecules per gram molecule of polychlorotoluene charged, with approximately 0.5 to 1.0 gram molecule preferred. The presence of more than this amount of 85–95% acid results in a system containing so much water that its reflux temperature initially lies below that required for successful operation if some of the water is not removed. When the reaction mixture contains less than the specified amount of phosphoric acid, the oxidation-hydrolysis takes place at an exceedingly low rate.

Mixtures of concentrated sulfuric acid and boric acid in the molar ratio of from 0.3:1 to 1:1 may also be used in the oxidation-hydrolysis step. When less boric acid is present, considerable by-product formation occurs. More boric acid introduces sufficient water of dehydration to lower the reaction temperature. The preferred sulfuric acid is 75% to 100% acid. When mixtures of these acids are employed, the preferred temperature lies between 170° C. and 205° C., and it is desirable that the chlorination be carried out in strong visible light.

The amount of water required to convert the product of the side-chain chlorination to trichlorobenzoic acid lies between 2 and 3 gram molecules for each gram molecule of trichlorotoluene originally charged. This amount includes water present in the inorganic acid as well as that subsequently added. When sulfuric acid-boric acid mixtures are used, the amount of water also includes that resulting from the dehydration of the boric acid as well as the water in the sulfuric acid. The water is usually added to the reaction mixture at such a rate as to replace that consumed by the reaction and thereby to maintain the reaction temperature in the specified range. When the reaction is carried out on a large scale, the water is generally added as steam, which may be introduced under the surface of the reaction mixture so as to assist in the agitation of the mixture and increase the efficiency of the reaction.

While it is not necessary that a chlorination catalyst be used in the oxidation-hydrolysis step, strong visible light or another catalyst may be used. The oxidation-hydrolysis step is continued until a sample of the reaction mixture is substantially soluble in a dilute aqueous solution of sodium bicarbonate.

As is the case in the side-chain chlorination step, the time required to complete the oxidation-hydrolysis step is dependent upon a number of factors, including reaction temperature, rate of chlorine flow, presence or absence of catalyst, choice of inorganic acid, and amount and concentration of inorganic acid employed.

Inasmuch as the reaction mixture employed in the oxidation-hydrolysis step is made up of three phases: a hydrocarbon layer, an inorganic acid layer, and gaseous chlorine, it is necessary that sufficient agitation be provided to insure satisfactory contact between the phases during the reaction.

The inorganic acid layer may be separated after completion of the reaction and reused in the conversion of additional quantities of trichlorotoluene to trichlorobenzoic acid.

The product-containing layer is generally poured while hot into water which is then cooled and stirred to crystallize the trichlorobenzoic acid. It can also be poured directly onto chilled rolls to form a flaked product. The examples that follow illustrate the present invention. Specific enumeration of reaction conditions in the examples should not be interpreted as limitations on the invention except as indicated in the appended claims.

Example 1

Two hundred and twenty-five grams of a mixture of trichlorotoluenes which contained approximately 65% of the 2,3,6-isomer and about 25% of 2,4,5-isomer was side-chain chlorinated by passing 475 grams of chlorine over its surface at the rate of about 110 grams per hour while the trichlorotoluene was being efficiently stirred. This reaction, which was carried out at 215°–220° C., yielded 310 grams of a mixture of trichlorobenzal chloride and trichlorobenzotrichloride. The increase in the weight of the reaction mixture during the chlorination corresponded to the addition of approximately 2.1 gram atoms of chlorine per gram molecule of trichlorotoluene.

The reaction mixture was then further chlorinated as described above at 190°–220° C. while 90 grams of 85% phosphoric acid was added over the course of 90 minutes. While the chlorination was continued, 45 grams of water was added at such a rate that the reaction temperature was maintained at 190°–220° C. The addition of water was completed in approximately 10 hours. At the end of this time the reaction mixture, which was soluble in a dilute sodium bicarbonate solution, was poured into 425 grams of water, and the resulting mixture was cooled to 10° C. and stirred until the product crystallized. The product was collected, washed with two 150-gram portions of water, and dried under vacuum at 55°–60° C. for 12 hours. In this way there was obtained 250 grams of trichlorobenzoic acid containing approximately 62% of the 2,3,6-isomer.

Example 2

A mixture of 254 grams of a trichlorotoluene mixture containing approximately 65% of the 2,3,6-isomer and 101.5 grams of 85% phosphoric acid was heated with efficient stirring to reflux temperature (155°–160° C.). In the presence of light from a 300 watt incandescent bulb, chlorine was passed over the surface of the mixture at the rate of 110–120 grams per hour. The reflux temperature rose gradually to 195°–200° C. over the course of 5 hours, after which 46 grams of water was added at such a rate as to maintain the reflux temperature in the range of 190°–200° C. During the 11 hours required for the addition of water, the chlorination was continued, and there was copious evolution of hydrogen chloride. At the end of this time a sample of the upper layer of the reaction mixture was soluble in dilute sodium bicarbonate solution.

The reaction mixture was poured into 400 grams of water, and the mixture was cooled with stirring until crystallization occurred. The product was collected, washed, and dried as described in Example 1 to yield 289 grams of trichlorobenzoic acid which contained approximately 63% of the 2,3,6-isomer.

*Example 3*

Three hundred and eight grams of a trichlorobenzal chloride-trichlorobenzotrichloride mixture obtained by the side-chain chlorination of 224 grams of trichlorotoluene which contained about 65% of the 2,3,6-isomer and about 25% of the 2,4,5-isomer was heated with stirring at 190°–200° C. while 90 grams of 85% phosphoric acid was added over the course of 75 minutes. During this time chlorine was passed over the surface of the reaction mixture at the rate of approximately 140 grams per hour. During the next 9 hours, while the chlorination was continued, 36 grams of water was added at such a rate that the temperature of the reaction mixture was maintained at 190°–200° C. At the end of this time a sample of the upper layer of the reaction mixture was soluble in a dilute solution of sodium bicarbonate. The reaction mixture was poured into 424 grams of water and cooled with stirring to 10° C. Washing and drying of the crystalline product were carried out as described in Example 1. There was obtained by this procedure 251 grams of trichlorobenzoic acid containing approximately 60% of the 2,3,6-isomer.

*Example 4*

A mixture of 260 grams of trichlorotoluene containing 55% of the 2,3,6-isomer with the 2,4,5-isomer constituting the major portion of the other isomers, and 204 grams of 99% phosphoric acid was chlorinated in strong visible light at 215°–220° C. for 6 hours at a chlorine flow rate of 130 grams per hour. Chlorination was then continued for 9 hours during which time 55 grams of water was added at such a rate that the temperature of the reaction mixture was maintained at 215°–220° C. The hydrolyzed and oxidized reaction mixture was poured into 530 grams of water, and the mixture was cooled with stirring to 10° C. to crystallize the product. The solid product, after washing and drying, weighed 306 grams and contained 52% of 2,3,6-trichlorobenzoic acid.

*Example 5*

A mixture of 200 grams of trichlorotoluenes containing approximately 65% of the 2,3,6-isomer and about 25% of the 2,4,5-isomer, 58 grams of boric acid, and 45 grams of 96% sulfuric acid was heated to 170° C. Then chlorine was passed over the surface of the mixture for 20 hours during which time a temperature of 170°–205° C. was maintained. This chlorination was catalyzed by light from a 300 watt incandescent bulb. The reaction mixture, which was soluble in dilute sodium bicarbonate solution, was poured into 250 ml. of water. The layer containing the product was separated from the boric acid-containing layer, neutralized with 50% sodium hydroxide, treated with diatomaceous earth and activated carbon, and then acidified with concentrated hydrochloric acid. An oily product was obtained which crystallized on cooling. After being washed with water and dried at 55°–65° C., the product, which contained approximately 60% of the 2,3,6-trichlorobenzoic acid, weighed 193 grams.

*Example 6*

The procedure described in Example 2 was repeated using as the starting material a mixture of polychlorotoluenes containing approximately 4% of 2,6-dichlorotoluene, 3% of other dichlorotoluenes, 45% of 2,3,6-trichlorotoluene, 42% of other trichlorotoluenes, 5% of 2,3,5,6-tetrachlorotoluene, and 1% of other tetrachlorotoluenes. A 91% yield of polychlorobenzoic acids was obtained which contained approximately 44% of 2,3,6-trichlorobenzoic acid, 5% of 2,3,5,6-tetrachlorobenzoic acid, and a smaller amount of 2,6-dichlorobenzoic acid.

*Example 7*

This is a comparative example that demonstrates the chlorinolysis of 2,3,6-isomer that occurs when a mixture of trichlorotoluenes that contains a substantial amount of this isomer is side-chain chlorinated in the absence of phosphoric acid. It is believed that the chlorinolysis of the 2,3,6-isomer takes place according to the following equations which are not balanced:

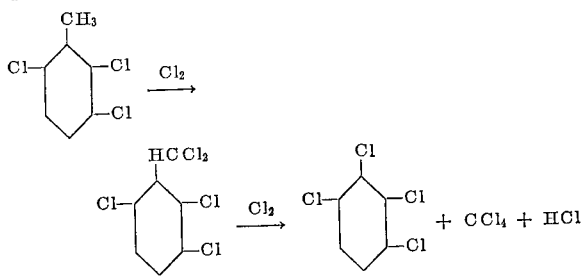

A mixture of trichlorotoluenes containing 52% of the 2,3,6-isomer and 40–45% of isomers not containing chlorine in the 2 and 6 positions was heated at 215°–220° C. while gaseous chlorine was passed over its surface. The weight of the reaction mixture increased steadily during the chlorination until the weight increase corresponded to the addition of 2.4 gram atoms of chlorine per gram molecule of trichlorotoluene. Upon further chlorination the weight of the reaction mixture decreased and a volatile compound, which was later identified as carbon tetrachloride, was evolved. The reaction product, whose weight indicated that 2.16 gram atoms of chlorine had been added per gram molecule of trichlorotoluene, was distilled under reduced pressure. A fraction that was collected at 93°–96° C./1.2 mm. and that made up 22% of the reaction product was found to be 1,2,3,4-tetrachlorobenzene. The distillation residue upon hydrolysis followed by oxidation with $HNO_3$ was converted to a mixture of trichlorobenzoic acids containing 21% of the 2,3,6-isomer. The 2,3,6-isomer was preferentially converted to tetrachlorobenzene by chlorinolysis, thereby greatly decreasing the relative amount of this isomer in the trichlorobenzoic acid product.

The trichlorotoluene used in Example 7 was prepared by ring chlorinating toluene and the 2,3,6-isomer content was determined. Based on analyses of other trichlorotoluenes produced in a similar manner, it is known that this mixture contained about 30% of 2,4,5-isomer and 10% of 2,3,4-isomer with the remainder being a mixture of the 2,4,6-isomer and the 2,3,5-isomer.

In all of the foregoing examples hydrochloric acid was produced and removed as it formed in the gaseous phase.

It is to be understood that variations may be made and that when other polychlorotoluenes such as dichloro-, tetrachloro-, or pentachlorotoluenes are used that temperatures other than those specified for trichlorotoluene will be desirable.

I claim:
1. The process for the production of polychlorobenzoic acid having a chlorine atom in each of the two ring positions adjacent the carboxyl group comprising contacting polychlorotoluene having a chlorine atom in each of the two ring positions adjacent the methyl group with chlorine in the presence of an inorganic acid selected from the group consisting of phosphoric acid and mixtures of sulfuric and boric acid containing from 0.3 to 1 gram molecule of sulfuric acid per gram molecule of boric acid until the polychlorotoluene is side-chain chlorinated to polychlorobenzal chloride, and passing gaseous chlorine into contact with the resulting reaction mixture in the presence of water until a substantial portion of the polychlorobenzal chloride has been converted to polychlorobenzoic acid.

2. The process for the production of polychlorobenzoic acid having a chlorine atom in each of the two ring positions adjacent the carboxyl group comprising contacting polychlorotoluene having a chlorine atom in each of the two ring positions adjacent the methyl group with chlorine until the polychlorotoluene is side-chain chlorinated to polychlorobenzal chloride, and passing gaseous chlorine into contact with the polychlorobenzal chloride in the presence of concentrated phosphoric acid and water until a substantial portion of the polychlorobenzal chloride has been converted to polychlorobenzoic acid, the phosphoric acid being present in an amount of from 0.2 to 3.0 gram molecules per gram molecule of polychlorobenzal chloride and the total amount of water present being at least 2 gram molecules per gram molecule of polychlorobenzal chloride.

3. The process for the production of a mixture of polychlorobenzoic acids containing a substantial amount of polychlorobenzoic acid having a chlorine atom in each of the two ortho ring positions and other polychlorobenzoic acid not having a chlorine atom in each of the two ortho ring positions from a mixture of polychlorotoluenes containing a substantial amount of a first polychlorotoluene having a chlorine atom in each of the two ring positions adjacent the methyl group and other polychlorotoluene not having a chlorine atom in each of the two ring positions adjacent the methyl group, the process comprising the steps of contacting and side-chain chlorinating such a mixture of trichlorotoluenes with chlorine until the trichlorotoluenes are side-chain chlorinated in the range of a minimum amount of 2 gram atoms of chlorine per gram molecule of all of the trichlorotoluenes and a maximum amount of 2 gram atoms of chlorine per gram molecule of said first polychlorotoluene plus 3 gram atoms of chlorine per gram molecule of said other polychlorotoluene, and passing gaseous chlorine into contact with the side chain chlorinated polychlorotoluenes in the presence of an inorganic acid selected from the group consisting of phosphoric acid and mixtures of sulfuric acid and boric acid containing from 0.3 to 1 gram molecule of sulfuric acid per gram molecule of boric acid and in the presence of water until a substantial portion of the side-chain chlorinated polychlorotoluenes have been converted to polychlorobenzoic acids, said inorganic acid being present in an amount of from 0.2 to 3.0 gram molecules per gram molecule of polychlorotoluenes and the total amount of water present being at least 2 gram molecules per gram molecule of polychlorotoluenes.

4. The process for the production of a mixture of polychlorobenzoic acids containing a substantial amount of polychlorobenzoic acid having a chlorine atom in each of the two ortho ring positions and other polychlorobenzoic acid not having a chlorine atom in each of the two ortho ring positions from a mixture of polychlorotoluenes containing a substantial amount of a first polychlorotoluene having a chlorine atom in each of the two ring positions adjacent the methyl group and other polychlorotoluene not having a chlorine atom in each of the two ring positions adjacent the methyl group, the process comprising the steps of contacting and side-chain chlorinating such a mixture of trichlorotoluenes with chlorine until the trichlorotoluenes are side-chain chlorinated in the range of a minimum amount of 2 gram atoms of chlorine per gram molecule of all of the trichlorotoluenes and a maximum amount of 2 gram atoms of chlorine per gram molecule of said first polychlorotoluene plus 3 gram atoms of chlorine per gram molecule of said other polychlorotoluene, and passing gaseous chlorine into contact with the side chain chlorinated polychlorotoluenes in the presence of 85–95% phosphoric acid and water until a substantial portion of the side-chain chlorinated polychlorotoluenes have been converted to polychlorobenzoic acids, said phosphoric acid being present in an amount of from 0.2 to 3.0 gram molecules per gram molecule of polychlorotoluenes and the total amount of water present being at least 2 gram molecules per gram molecule of polychlorotoluenes.

5. The process for the production of trichlorobenzoic acid including 2,3,6-trichlorobenzoic acid which comprises contacting trichlorotoluene including at least 45% of 2,3,6-trichlorotoluene at a temperature between approximately 180° C. and 230° C. with chlorine and side-chain chlorinating the trichlorotoluene in the amount of approximately 2 to 2.5 gram atoms of chlorine for each gram molecule of trichlorotoluene, thereby forming a mixture of trichlorobenzal chlorides and trichlorobenzotrichlorides containing at least approximately 45% of said trichlorobenzal chlorides and thereafter heating said mixture of trichlorobenzal chlorides and trichlorobenzotrichlorides at a temperature between approximately 150° C. and 230° C. with chlorine in the presence of water and an acid selected from the group consisting of concentrated phosphoric acid and mixtures of concentrated sulfuric acid and boric acid containing 0.3 to 1 gram molecule of sulfuric acid for each gram molecule of boric acid, said acid being present in the amount of approximately 0.2 to 3.0 gram molecules per gram molecule of trichlorotoluene originally charged and said water being present in the amount of approximately 2 to 3 gram molecules per gram molecule of trichlorotoluene originally charged, thereby forming trichlorobenzoic acid including 2,3,6-trichlorobenzoic acid.

6. The process for the production of trichlorobenzoic acid including 2,3,6-trichlorobenzoic acid which comprises flowing chlorine into contact with trichlorotoluene including at least 45% of 2,3,6-trichlorotoluene at a temperature between approximately 170° C. and 225° C. in strong visible light and in the presence of water, sulfuric acid of 75% to 90% concentration, and boric acid, said sulfuric acid being present in the amount of 0.3 to 1 gram molecule for each gram molecule of boric acid, the total amount of said acids being approximately 0.5 to 1 gram molecule per gram molecule of trichlorotoluene and the total amount of water present being approximately 2 to 3 gram molecules per gram molecule of trichlorotoluene, and continuing the flow of chlorine until the trichlorotoluene has been converted to trichlorobenzoic acid including 2,3,6-trichlorobenzoic acid.

7. A process for the preparation of polychlorobenzoic acid having a chlorine atom in each of the two ring positions adjacent to the carboxyl group from polychlorobenzaldehyde having a chlorine atom in each of the two ring positions adjacent the group, —CHCl$_2$, comprising flowing gaseous chlorine into contact with such polychlorobenzal chloride in the presence of water and an inorganic acid selected from the group consisting of phosphoric acid and mixtures of sulfuric acid and boric acid, containing from 0.3 to 1 gram molecule of sulfuric acid per gram molecule of boric acid, and continuing the flow of chlorine until a substantial portion of the polychlorobenzal chloride has been converted to polychlorobenzoic acid.

8. A process for the preparation of polychlorobenzoic acid having a chlorine atom in each of the two ring positions adjacent to the carboxyl group from polychlorobenzaldehyde having a chlorine atom in each of the two ring positions adjacent the group, —CHCl$_2$, comprising flowing gaseous chlorine into contact with such polychlorobenzal chloride in the presence of water and an inorganic acid selected from the group consisting of phosphoric acid and mixtures of sulfuric acid and boric acid containing from 0.3 to 1 gram molecule of sulfuric acid per gram molecule of boric acid, said inorganic acid being present in the amount of from 0.2 to 3.0 gram molecules per gram molecule of polychlorobenzal chloride and the total amount of water present being at least 2 gram molecules per gram molecule of polychlorobenzal chloride, and continuing the flow of chlorine until a substantial portion of the polychlorobenzal chloride has been converted to polychlorobenzoic acid.

References Cited by the Examiner

UNITED STATES PATENTS 1,867,766  7/1932   Schindhelm ----- 260—515 XR
2,816,144  12/1957  Harris ------------ 260—599
3,005,694  10/1961  Entemann.

OTHER REFERENCES

Daimler, German printed application No. F 11,281, Sept. 29, 1955.

LORRAINE A. WEINBERGER, *Primary Examiner.*

LEON ZITVER, *Examiner.*